US012540497B2

(12) United States Patent
Rudolf et al.

(10) Patent No.: US 12,540,497 B2
(45) Date of Patent: Feb. 3, 2026

(54) OPERATING MECHANISM FOR OPERATING VEHICLE DOORS

(71) Applicant: Illinois Tool Works Inc., Glenview, IL (US)

(72) Inventors: Andreas Rudolf, Eibelstadt (DE); Zsolt Wilke, Bad Mergentheim (DE)

(73) Assignee: Illinois Tool Works Inc., Glenview, IL (US)

( * ) Notice: Subject to any disclaimer, the term of this patent is extended or adjusted under 35 U.S.C. 154(b) by 140 days.

(21) Appl. No.: 18/509,577

(22) Filed: Nov. 15, 2023

(65) Prior Publication Data

US 2024/0175303 A1 May 30, 2024

(30) Foreign Application Priority Data

Nov. 28, 2022 (DE) ..................... 10 2022 131 428.6

(51) Int. Cl.
*E05B 85/10* (2014.01)
*E05B 81/42* (2014.01)

(52) U.S. Cl.
CPC ............ *E05B 85/107* (2013.01); *E05B 81/42* (2013.01)

(58) Field of Classification Search
CPC ............................... E05B 85/107; E05B 81/42
See application file for complete search history.

(56) References Cited

U.S. PATENT DOCUMENTS 1,079,409 A * 11/1913 Hendricks ............... F16B 12/56 5/304
5,632,516 A * 5/1997 Schwab .................. E05B 85/18 292/DIG. 31
7,244,897 B2 7/2007 Victor
(Continued)

FOREIGN PATENT DOCUMENTS

DE 102005034763 B3 9/2006
DE 202006011116 U1 9/2006
(Continued)

OTHER PUBLICATIONS

Examination Report dated Mar. 1, 2023 in German application No. 10 2022 115 841.1, filed on Jun. 24, 2022 (8 pages).
(Continued)

*Primary Examiner* — Mark A Williams
(74) *Attorney, Agent, or Firm* — McAndrews, Held & Malloy, Ltd.

(57) ABSTRACT

The present disclosure relates to an actuating mechanism for actuating, in particular unlocking and opening, vehicle doors. The actuating mechanism includes: an actuator (104), in particular with a handle, for opening vehicle doors (102); a kinematics (200, 300, 400, 500, 600, 700) for transmitting a movement of the actuator to a signal transmitter. The kinematics (200, 300, 400, 500, 600, 700) comprises a cam disk (204, 304, 404, 504, 604, 704); and an elastic biasing element (206, 306, 406, 506, 606, 706) biased against the cam disk (204, 304, 404, 504, 604, 704). The cam disk (204, 304, 404, 504, 604, 704) cooperates with the biasing element
(Continued)

(206, 306, 406, 506, 606, 706) in order to define a first force threshold for a first rotation of the cam disk (204, 304, 404, 504, 604, 704) as well as a second, higher force threshold for a second, downstream rotation of the cam disk (204, 304, 404, 504, 604, 704).

20 Claims, 15 Drawing Sheets

(56) References Cited

U.S. PATENT DOCUMENTS

| | | | | |
|---|---|---|---|---|
| 8,443,553 | B1 * | 5/2013 | Polewarczyk | E05B 81/77<br>292/DIG. 31 |
| 8,629,361 | B2 | 1/2014 | Koyama | |
| 8,701,353 | B2 * | 4/2014 | Patel | E05B 85/103<br>292/201 |
| 8,733,022 | B2 * | 5/2014 | Sonnek | E05B 81/76<br>49/460 |
| 8,809,710 | B2 | 8/2014 | Ulomek | |
| 9,316,020 | B2 * | 4/2016 | Lee | E05B 1/003 |
| 10,550,610 | B2 * | 2/2020 | Linden | E05B 81/90 |
| 10,550,611 | B2 * | 2/2020 | Och | E05B 85/107 |
| 11,578,513 | B2 * | 2/2023 | Heyduck | E05B 81/06 |
| 11,679,651 | B2 * | 6/2023 | Couto Maquieira | B60J 5/0416<br>292/336.3 |
| 2013/0168979 | A1 * | 7/2013 | Minemura | E05B 85/12<br>292/336.3 |
| 2014/0132012 | A1 * | 5/2014 | Yoshino | E05B 85/103<br>292/336.3 |
| 2020/0031209 | A1 | 1/2020 | Fukui | |
| 2021/0340793 | A1 * | 11/2021 | Oberst | H01H 1/5866 |
| 2022/0186530 | A1 | 6/2022 | Wilke | |
| 2023/0417087 | A1 | 12/2023 | Oberst | |
| 2023/0420200 | A1 | 12/2023 | Oberst | |
| 2023/0420201 | A1 | 12/2023 | Oberst | |
| 2024/0110410 | A1 | 4/2024 | Yong | |

FOREIGN PATENT DOCUMENTS

| | | | |
|---|---|---|---|
| DE | 102015102839 | A1 | 10/2015 |
| DE | 102016202215 | A1 | 8/2017 |
| DE | 102016106651 | A1 | 10/2017 |
| DE | 102017104514 | A1 | 3/2018 |
| DE | 102018117226 | A1 | 1/2020 |
| DE | 102019100787 | A1 | 7/2020 |
| DE | 102019129898 | A1 | 5/2021 |
| DE | 102021105801 | B3 | 6/2022 |
| DE | 102021132330 | A1 | 6/2023 |
| DE | 102023100577 | A1 | 7/2023 |
| DE | 102022102402 | A1 | 8/2023 |
| DE | 102022104911 | A1 | 9/2023 |
| DE | 102023111403 | A1 | 11/2023 |
| DE | 102022115229 | A1 | 12/2023 |
| DE | 102022207400 | A1 | 1/2024 |
| DE | 202024100401 | U1 | 2/2024 |
| DE | 102022122345 | A1 | 3/2024 |
| DE | 202024100582 | U1 | 3/2024 |
| DE | 202024100584 | U1 | 3/2024 |
| DE | 102022126153 | A1 | 4/2024 |
| DE | 102022128434 | A1 | 5/2024 |
| DE | 102024117807 | A1 | 1/2025 |
| DE | 102023132035 | A1 | 5/2025 |
| EP | 1431994 | A2 | 6/2004 |
| EP | 1568053 | A1 | 8/2005 |
| EP | 1677324 | A2 | 7/2006 |
| EP | 2800117 | A1 | 11/2014 |
| EP | 2886760 | A1 | 6/2015 |
| EP | 3044040 | A1 | 7/2016 |
| EP | 3079211 | A1 | 10/2016 |
| EP | 3044040 | B1 | 6/2017 |
| EP | 3512727 | A1 | 7/2019 |
| FR | 2865708 | A1 | 8/2005 |
| WO | 2004042177 | A1 | 5/2004 |

OTHER PUBLICATIONS

Examination Report dated Apr. 1, 2023 in German application No. 10 2022 115 843.8, filed on Jun. 24, 2022 (7 pages).

Examination Report dated Apr. 1, 2023 in German application No. 10 2022 115 844.6, filed on Jun. 24, 2022 (6 pages).

* cited by examiner

OPERATING MECHANISM FOR OPERATING VEHICLE DOORS

RELATED APPLICATION

The present application claims the benefit of German Patent Application No. 10 2022 131 428.6, filed Nov. 28, 2022, titled “Operating Mechanism for Operating Vehicle Doors,” the contents of which are hereby incorporated by reference.

BACKGROUND

In particular in the automotive industry, doors and flaps are increasingly no longer only opened or closed (locked and unlocked) manually, i.e., mechanically. Rather, the opening or closing movements are performed more frequently automatically, in particular electrically. For example, an electric motor is used here, which, when desired, drives a mechanism for opening or closing (locking and unlocking) the doors and flaps. In order to generate a signal for opening or closing (locking and unlocking) to such electric drives or the associated control devices, a switch can be provided, which generates the desired signal by an actuation of the user. Such switches can be configured as push-buttons, which, when pressed in by the user, generate the aforementioned signal.

In order to not be reliant on the opening or closing of the doors by the electric drive, it is known to provide a mechanical (manual) emergency release. This allows the user to open the doors or flaps manually. Such mechanical actuating elements, such as conventional interior or exterior door handles, are often provided separately from the push-buttons configured as signal transmitters. Not only does this require additional design space for the mechanical variant, but it also results in a non-uniform overall image in which modern electrical push-buttons are connected to traditional mechanical levers.

For the above-mentioned reasons, the problem addressed by the present disclosure is to specify an actuating mechanism for actuating vehicle doors, which enables an electrical as well as manual actuating function and can be arranged even in the smallest possible space. The new actuating mechanism is intended to generate, in a simple manner, haptic feedback, by way of which the user can feel the actuation of the electrical signal transmitter or the actuation of the emergency release.

SUMMARY

The present disclosure relates generally to an actuating mechanism, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
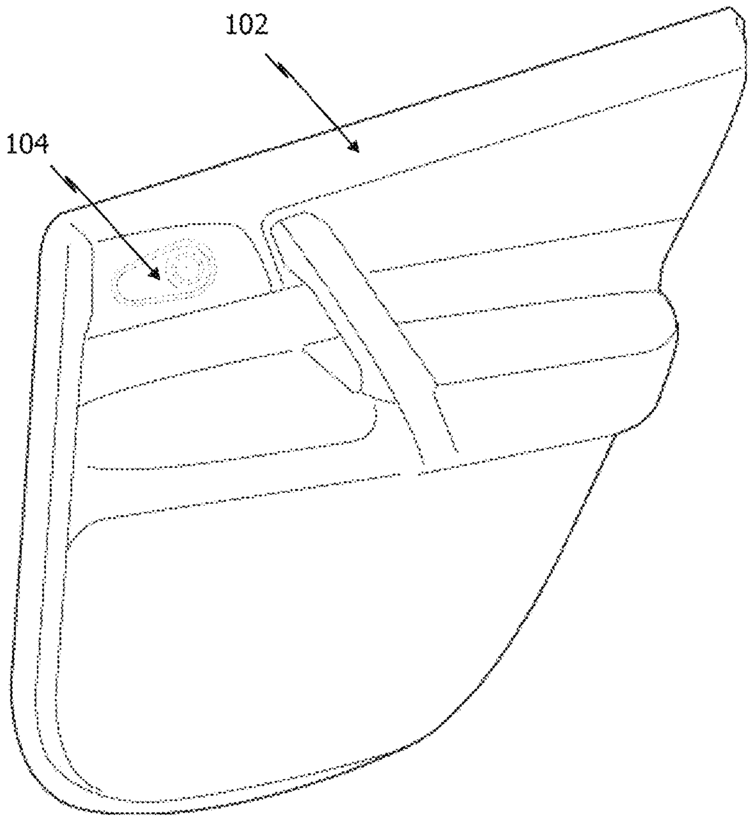
FIG. 1 illustrates a schematic view of an interior door having an actuating mechanism according to one embodiment of the present disclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as “first,” “second,” “top,” “bottom,” “side,” “front,” “back,” and the like are words of convenience and are not to be construed as limiting terms. For example, while in some examples a first side is located adjacent or near a second side, the terms “first side” and “second side” do not imply any specific order in which the sides are ordered.

The terms “about,” “approximately,” “substantially,” or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The present disclosure relates to an actuating mechanism for actuating vehicle doors, in particular for opening vehicle doors. The present disclosure further relates to a vehicle having an actuating mechanism for actuating vehicle doors.

Accordingly, the disclosure relates to an actuating mechanism for actuating, in particular unlocking and opening, vehicle doors, wherein the actuating mechanism comprises the following: an actuator, in particular with a handle, for opening vehicle doors; a kinematics for transmitting a movement of the actuator to a signal transmitter, wherein the kinematics comprises a cam disk; an elastic biasing element biased against the cam disk, wherein the cam disk cooperates with the biasing element in order to define a first force threshold for a first rotation of the cam disk as well as a second, higher force threshold for a second, downstream rotation of the cam disk.

With the new actuating mechanism, haptic feedback is generated by two different force thresholds. Firstly, when actuating the actuator, the user immediately feels the first force threshold, which must be overcome in order to move the actuator and thus the kinematics. The first movement results in a first rotation of the cam disk. This first rotation of the cam disk can, for example, actuate an electrical signal transmitter (e.g., a microswitch). As soon as the actuator is actuated, i.e., pressed or pulled, after the first rotation, a second force threshold is felt by the user. This force threshold is preferably higher than the first force threshold and can thus be perceived by the user as a stop, in particular. However, if the user continues to move the actuator even after the second force threshold, i.e., the perceived stop, has been felt, a mechanical emergency release can be activated as soon as the second force threshold has been overcome.

According to the aforementioned embodiment, with a single biasing element as well as a simple cam disk, it is possible to provide an actuating mechanism with two different functionalities, namely an electrical unlocking as well as a mechanical emergency release.

According to a further embodiment, the cam disk comprises a second step, which is configured to deform, in particular to compress, the biasing element by a first length before the first rotation is released, and preferably a second step, which is configured to deform, in particular to compress, the biasing element by a second length before the second rotation is released. The second length can be greater than the second length. Accordingly, it is achieved in a very straightforward manner that the second force threshold is higher than the first force threshold. In particular, the cam disk need only have a particular design with two consecutive shoulders or ledges. The second shoulder can be formed wider than the first shoulder.

According to a further embodiment, the cam disk comprises a transition region between the first step and the second step defining a rotational path of the cam disk during the first rotation. The transition region can be configured such that no further force threshold is felt after the first force threshold has been overcome until the second shoulder and thus the second force threshold has been reached. In other design variants, the transition region can be configured such that the force also increases slightly after overcoming the first force threshold, whereby a slight resistance is felt even after overcoming the first force threshold, until it increases again abruptly once the second shoulder is reached.

According to a further embodiment, the first step is formed by a ledge or nose of the cam disk.

According to a further embodiment, the biasing element comprises a metal spring configured to contact the cam disk with a first end. The biasing element configured as a metal spring has the advantage that it is inexpensive and robust.

According to a further embodiment, the biasing element comprises a plastic attachment arranged on the first end of the biasing element. With the plastic attachment, a high precision is achieved in addition to the inexpensive and robust metal spring, because the plastic element is very precisely adaptable to the shape of the cam disk.

According to a further embodiment, the biasing element comprises a plastic spring. According to this embodiment, a particularly precise transmission of force between the cam disk and the biasing element can occur.

According to a further embodiment, the kinematics is configured such that the first rotation of the cam disk serves to activate the signal transmitter and/or wherein the kinematics is configured such that the second rotation of the cam disk serves to activate an emergency release.

In a further aspect, the present disclosure relates to a vehicle door having an actuating mechanism as described above.

FIG. 1 shows a schematic view of an interior vehicle door 102 with an actuating mechanism for actuating, in particular opening, the vehicle door. In particular, the actuating mechanism shown schematically herein is provided in order to fulfill two opening functions: on the one hand, the actuating mechanism allows the vehicle door to be electrically opened. For this purpose, the actuating mechanism comprises an actuator 104, which, for example, can be pushed in by the user towards the vehicle door or can be pulled out of the door. On the other hand, the actuating mechanism can be used in order to manually, that is, mechanically, open the door, as will be discussed in greater detail later. This can be especially necessary when the electric drive or the associated signal transmitter fails.

It is noted at this point that the actuator 104 according to FIG. 1 is shown round and button-like, but it can also be configured in any other shape.

Figure 2A:
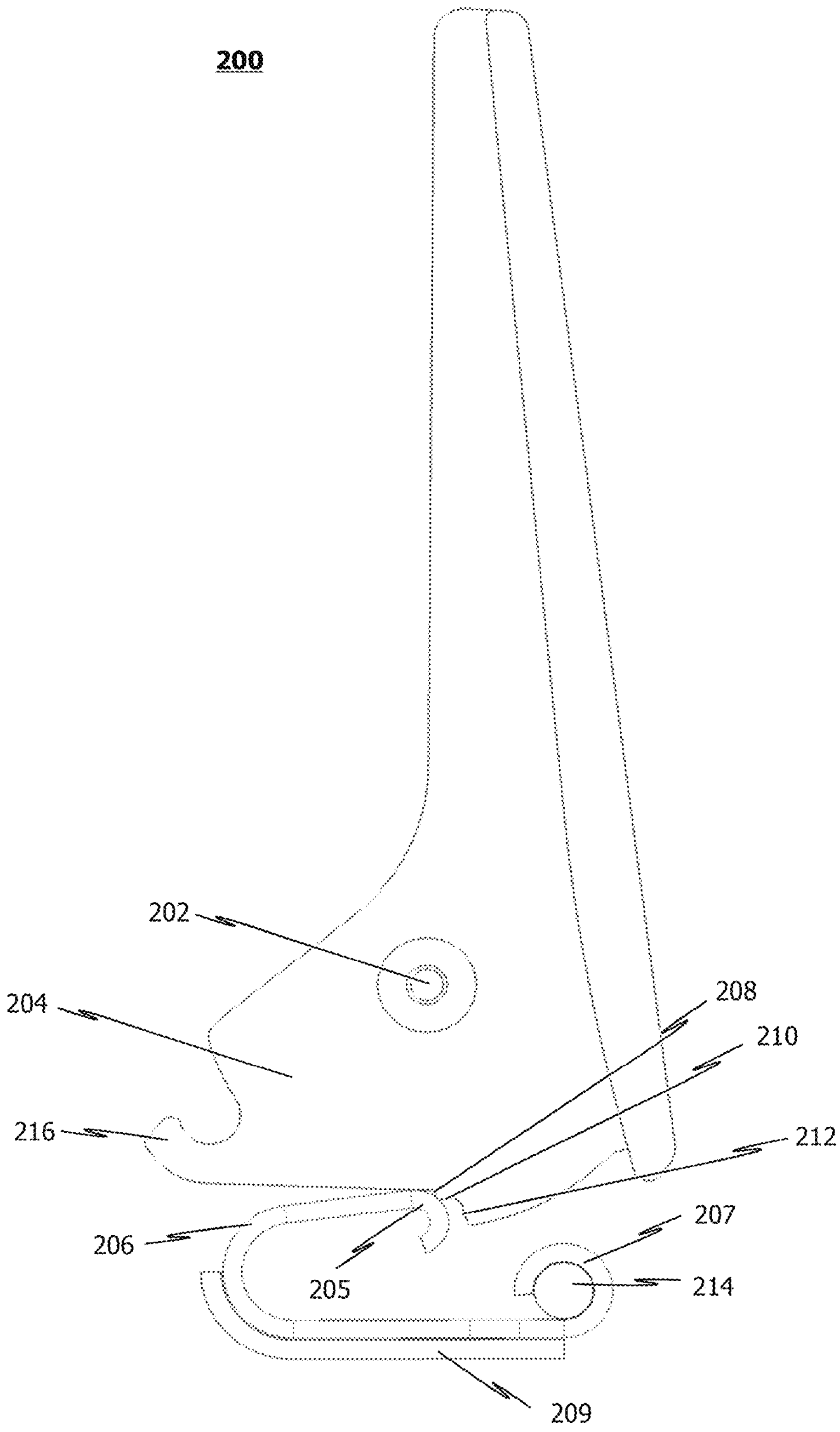
FIG. 2A illustrates a schematic side view of a kinematics having a cam disk connected to a biasing element according to one embodiment of the actuating mechanism.
Figure 2B:
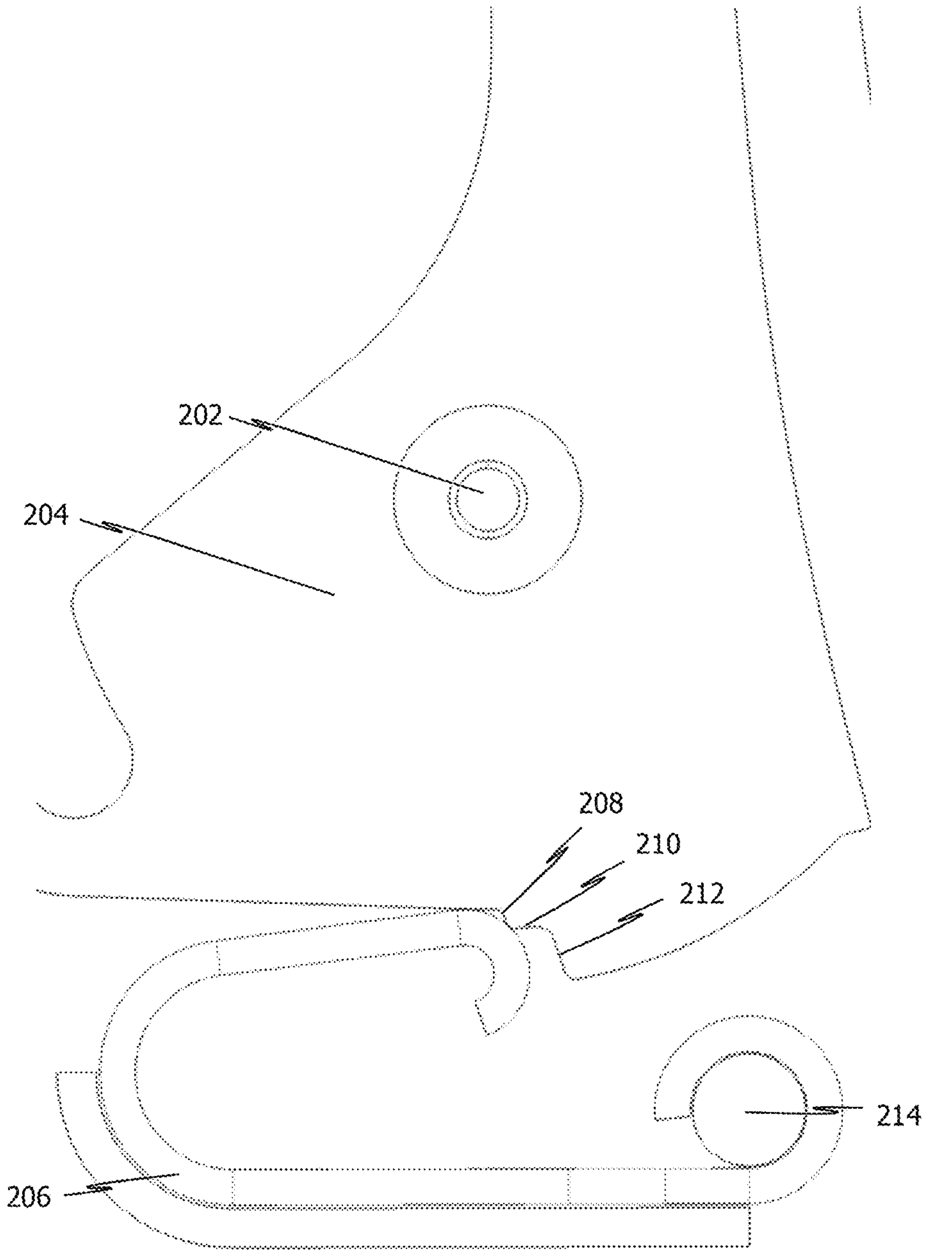
FIG. 2B illustrates an enlarged view of the embodiment according to FIG. 2A.

FIGS. 2A and 2B show sub-regions of a first embodiment of the actuating mechanism according to the present disclosure. In particular, FIGS. 2A and 2B show a kinematics 200 with a cam disk 204 that is rotatable about a pivot axis 202. Although this is not further shown in FIGS. 2A and 2B, the cam disk 204 can be connected to an actuator, such as the actuator 104 according to FIG. 1. This can be done either directly via the cam disk 204 or also via the pivot axis 202. However, the disclosure is not limited to the type of connection between the cam disk 204 and the actuator as long as a movement of the actuator is transmitted to the cam disk.

FIGS. 2A and 2B further show a biasing element 206, configured here as a metal spring, which is biased against the cam disk 204 with a first end 205. For example, a second end 207 is connected to a vehicle housing, such as the vehicle door, and thus fixed. For example, in the view according to FIGS. 2A and 2B, the second end 207 is fixedly connected to a pin 214 of the vehicle housing. A counter-bearing 209 is arranged on a side of biasing element 206 facing away from cam disk 204.

The first end 205 of the biasing element 206 configured as a metal spring, shown in a J-shape here, initially comes into contact with a first shoulder 208 of the cam disk 204 according to FIGS. 2A and 2B (better visible in FIG. 2B). The actuating mechanism is configured in particular such that an actuation of the actuator results in the cam disk 204 being rotated clockwise according to FIGS. 2A and 2B. Accordingly, the first shoulder 208 is pressed against the first end 205 of the biasing element 206. The pressure of the first shoulder 208 against the biasing element 206 causes the biasing element 206 to be deformed, in particular compressed. On the rear, the biasing element 206 is retained by the counter-bearing 209. The biasing element 206 is compressed until the first end 205 of the biasing element 206 slips from the first shoulder 208. This is the case in particular when a first force threshold is overcome by an actuation of the actuator.

By overcoming the first force threshold, a first rotation of the cam disk 204 in relation to the biasing element is released. Accordingly, the latter can move clockwise. The biasing element prevents a movement of the cam disk 204 until the first force threshold is overcome and the biasing element 206 is elastically deformed.

At this time, the first end of the biasing element is guided on a transition surface 210 (here, a straight surface) of the cam disk 204 until the biasing element 206 meets a downstream second shoulder 212 of the cam disk 204. The length of the transition surface 210 between the first shoulder 208 and the second shoulder 212 determines how far the cam disk 204 can be rotated after overcoming the first force threshold. Thus, using the extent of the transition surface 210, it can be determined in particular how far the actuator (cf. FIG. 1) can be moved (e.g., pulled) in normal operation, i.e., when the vehicle door is opened electrically, until a stop is felt.

Once the cam disk 204 has been rotated so far that the first end 205 of the biasing element 206 comes into contact with the second shoulder 212, the user in turn feels haptic feedback from the resistance now generated. This resistance generated by the second shoulder 212 results in a second force threshold, which can be higher than the first force threshold. For example, this is achieved in that the second shoulder 212 is wider than the first shoulder 208 and thus prevents the cam disk 204 from rotating further until the biasing element 206 is further compressed than was the case due to the first shoulder 208. In other words, the user feels a stop at this point, which, however, can be overcome with a sufficient force input (higher than the second force threshold), for example in order to activate an emergency release. The emergency release can be achieved, for example, via a Bowden pull, but this does not restrict the scope of the disclosure. To accommodate a Bowden pull, the kinematics 200 comprises a hook 216, which is connected to the cam disk 204, in particular integrally.

Figure 3A:
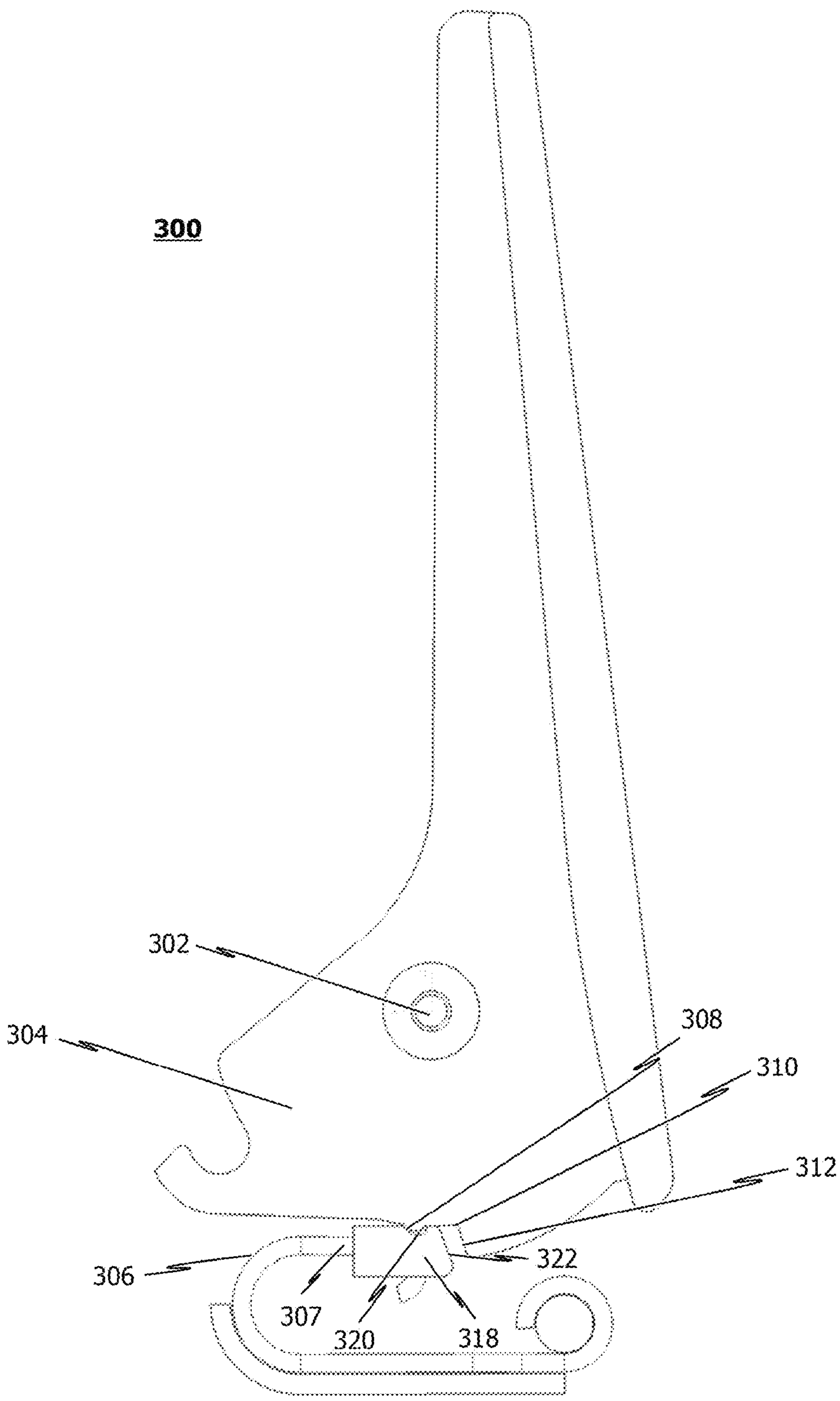
FIG. 3A illustrates a schematic side view of a kinematics having a cam disk connected to a biasing element according to one embodiment of the actuating mechanism.
Figure 3B:
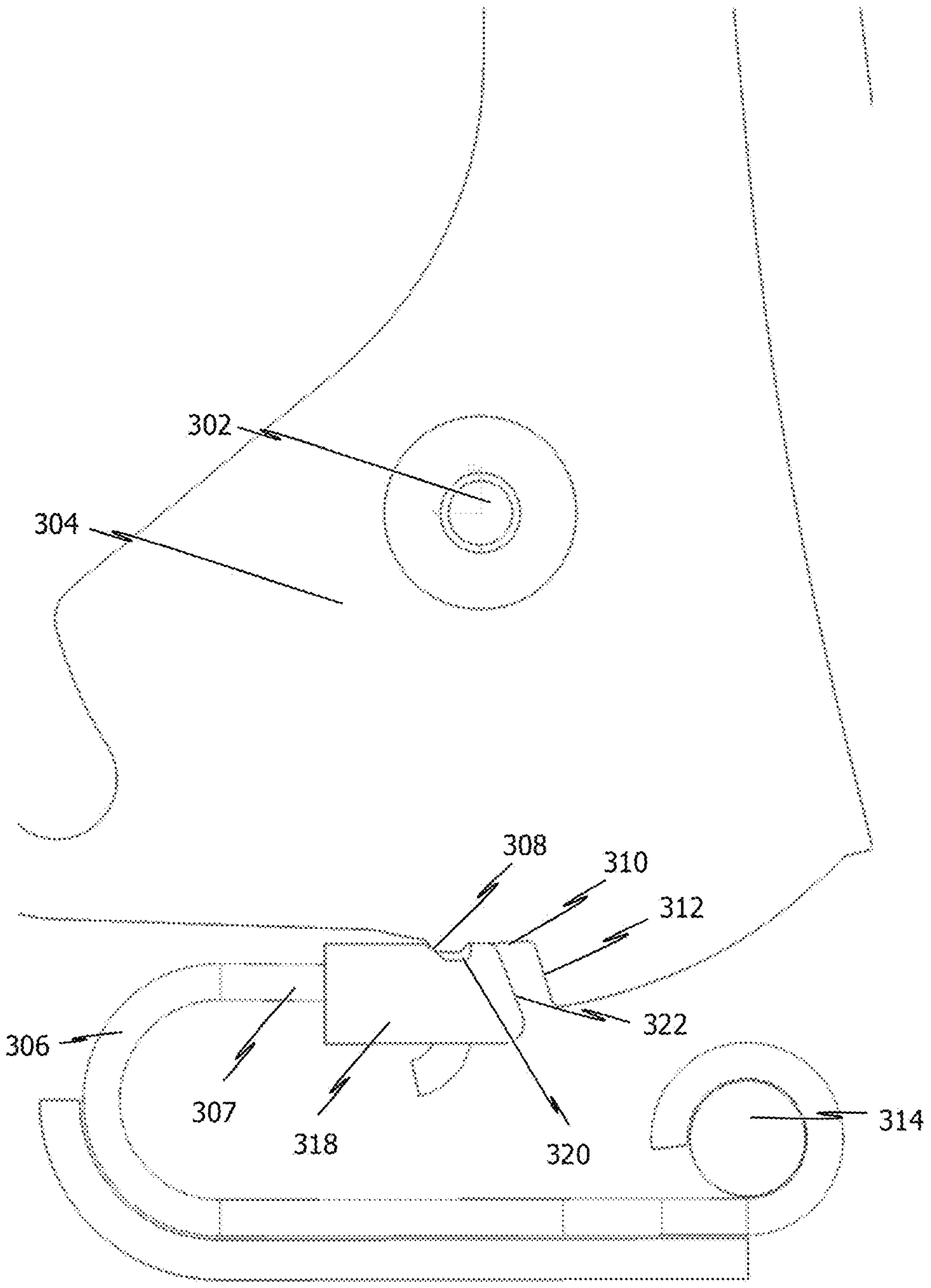
FIG. 3B illustrates an enlarged view of the embodiment according to FIG. 3A.

FIGS. 3A and 3B show schematic side views of a kinematics 300 according to a second embodiment of the actuating mechanism according to the present disclosure. The second embodiment according to FIGS. 3A and 3B differs from the first embodiment according to FIGS. 2A and 2B in particular in that an attachment, in particular a plastic attachment 318, is provided at the first end 307 of the biasing element 306, i.e., at the first end 307 of the metal spring, which serves to contact and thus cooperate with the first and second shoulders of the cam disk 304.

In the embodiment according to FIGS. 3A and 3B, the first shoulder 308 is configured in particular as a nose that engages with a recess 320 of the plastic attachment 318 in an initial position of the kinematics 300. By the cooperation of the nose and recess 320 of the plastic attachment 318, the first force threshold is defined. The second force threshold, on the other hand, is defined by a cooperation of a front end region 322 of the plastic attachment 318 with the second shoulder 312.

The second shoulder 312 is also configured as a ledge according to this second embodiment. With the first and second shoulders 308, 312 and the associated plastic attachment 318 shown in FIG. 3B, a particularly precise setting of the first and second force threshold is achieved.

In the position shown in FIG. 3A, a transition surface 310 (here, a straight surface) of the cam disk 304 is arranged between the front end region 322 of the plastic attachment 318 and the second shoulder 312. After overcoming the first force threshold, the cam disk 304 can be pivoted about the pivot axis 302 until the plastic attachment 318 meets the second shoulder 312 of the cam disk 304 that is positioned downstream of the first shoulder 308 (nose). The length of the transition surface 310 determines how far the cam disk 304 can be rotated after overcoming the first force threshold.

Figure 4A:
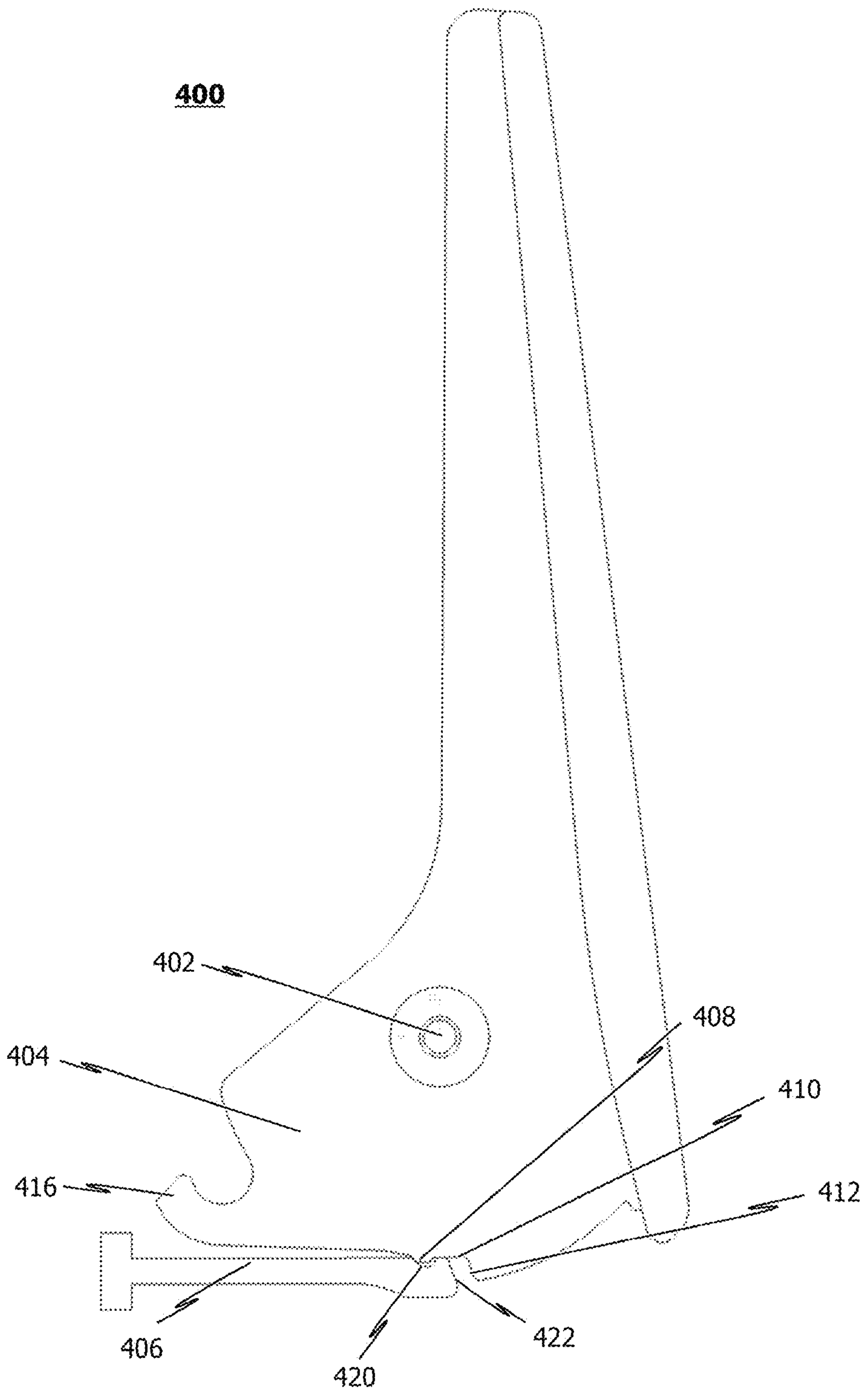
FIG. 4A illustrates a schematic side view of a kinematics having a cam disk connected to a biasing element according to one embodiment of the actuating mechanism.
Figure 4B:
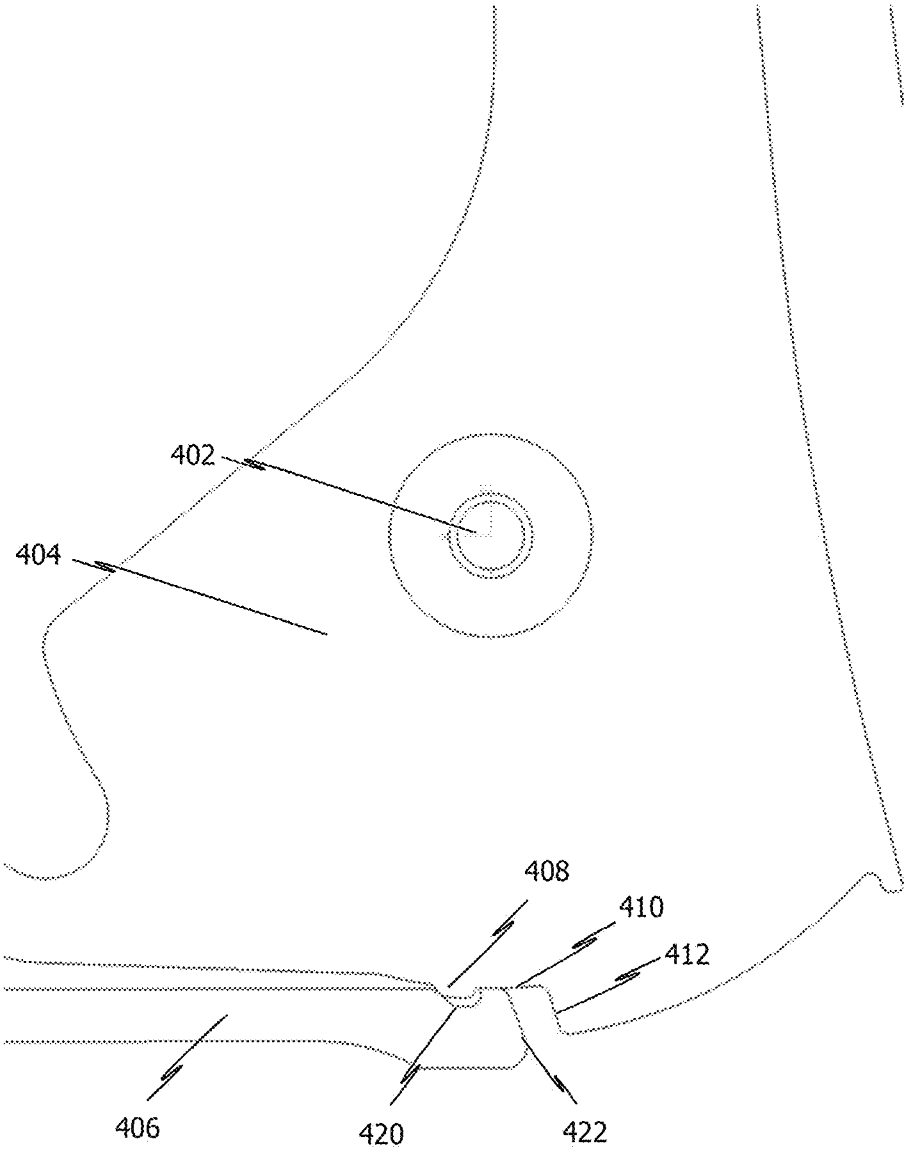
FIG. 4B illustrates an enlarged view of the embodiment according to FIG. 4B.

FIGS. 4A and 4B show further schematic side views of a kinematics 400 according to a third embodiment of the present disclosure. In FIGS. 4A and 4B, the biasing element 406 is formed entirely from plastic. The biasing element 406 is a plastic spring. The plastic spring according to FIGS. 4A and 4B also comprises a recess 420 that cooperates with the nose-shaped first shoulder 408 of the cam disk 404 in order to define the first force threshold. The biasing element 406 configured as a plastic spring also comprises a front end region 422 which is configured to cooperate with the ledge-shaped second shoulder 412 configured in order to define the second force threshold. By contrast to the second embodiment illustrated in FIGS. 3A and 3B, the entire biasing element 406 is now formed as a plastic spring.

In the position shown in FIG. 4A, a transition surface 410 (here, a straight surface) of the cam disk 404 is arranged between the front side 422 of the biasing element 406 and the second shoulder 412. After overcoming the first force threshold, the cam disk 404 can be pivoted about the pivot axis 402 until the front side 422 of the biasing element 406 meets the second shoulder 412 of the cam disk 404 positioned downstream of the first shoulder 408 (nose). The length of the transition surface 410 determines how far the cam disk 404 can be rotated after overcoming the first force threshold.

Figure 5A:
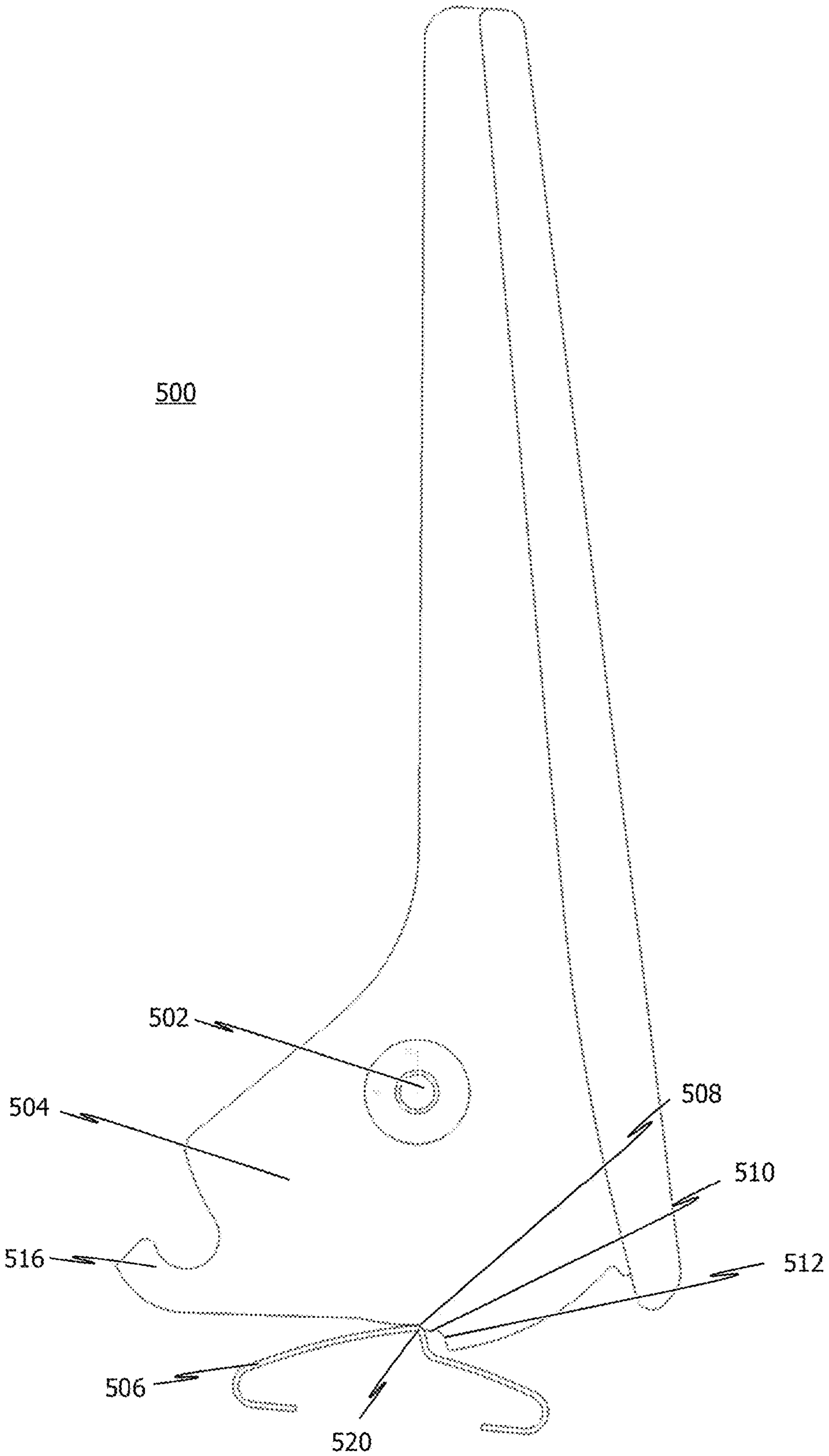
FIG. 5A illustrates a schematic side view of a kinematics having a cam disk connected to a biasing element according to one embodiment of the actuating mechanism.
Figure 5B:
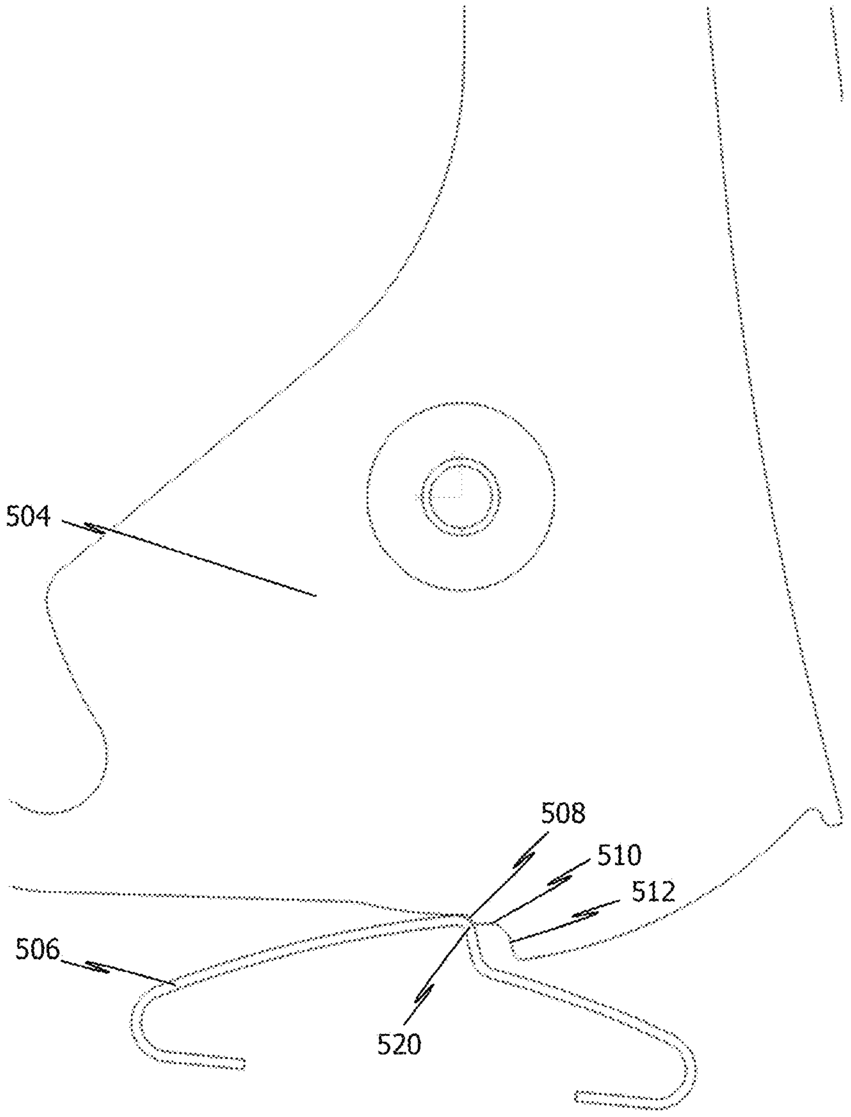
FIG. 5B illustrates an enlarged view of the embodiment according to FIG. 5B.

FIGS. 5A and 5B show side views of a further embodiment of a kinematics 500 according to the actuating mechanism of the present disclosure. By contrast to the embodiments shown above, the biasing element 506 according to FIGS. 5A and 5B is configured as a laminated spring. The laminated spring has a bending zone 520 in a central region between its first and second ends, which is configured to cooperate with the first and second shoulders 508, 512 of the cam disk 504 in order to define the first and second force threshold. A rotation of the cam disk 504 in relation to the biasing element 506 configured as a laminated spring results in the biasing element 506 being buckled/deformed downwards according to the illustrations of FIGS. 5A and 5B.

Also at the position shown in FIG. 5A, a transition surface 510 (here, a straight surface) of the cam disk 504 between the first and second shoulders 508, 512 is shown.

The use of a laminated spring has the advantage that it is not only inexpensive and robust, but also allows a very precise adjustment of the first and second force threshold.

Figure 6A:
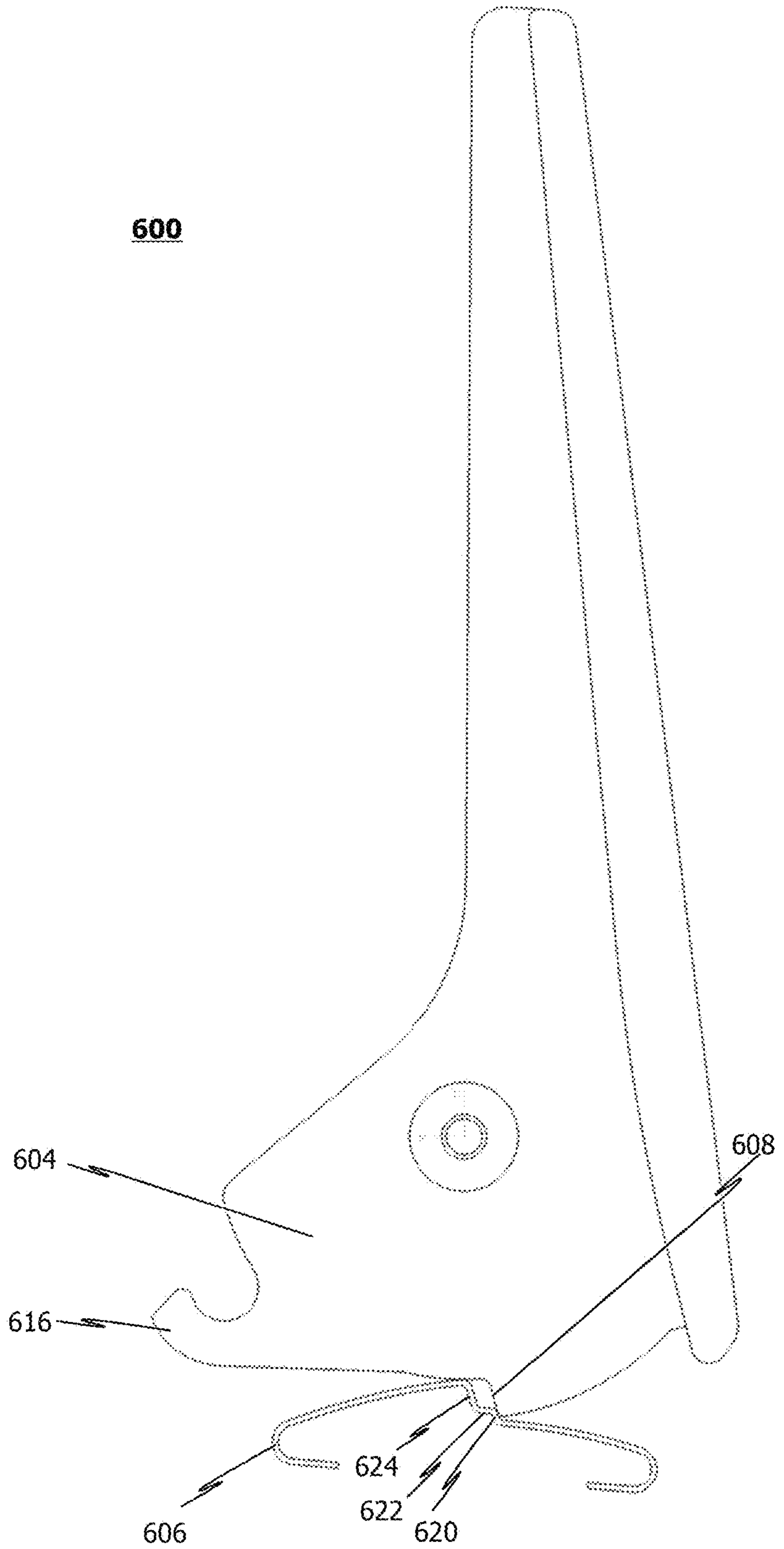
FIG. 6A illustrates a schematic side view of a kinematics having a cam disk connected to a biasing element according to one embodiment of the actuating mechanism.
Figure 6B:
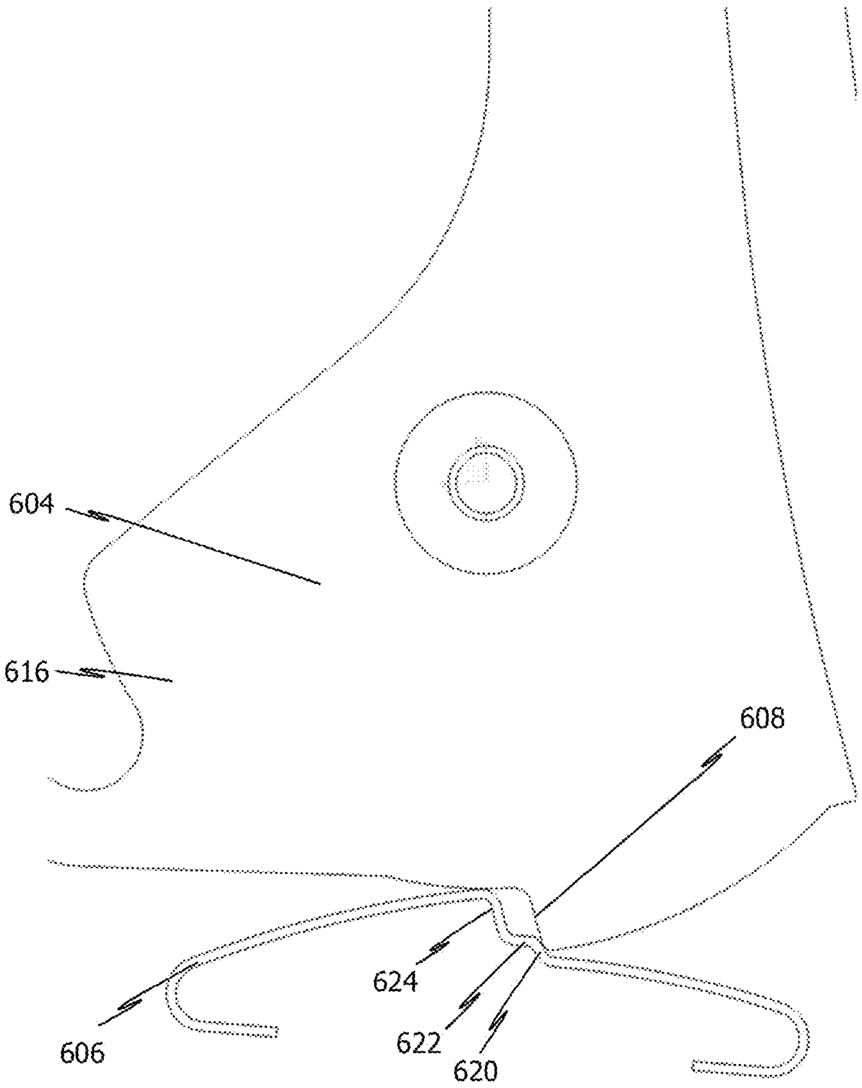
FIG. 6B illustrates an enlarged view of the embodiment according to FIG. 6A.

A second kinematics 600 having a laminated spring is shown in FIGS. 6A and 6B. According to the kinematics 600, the cam disk 604 only has one step 608. By contrast, two steps 620, 624, i.e., two shoulders are formed by the bending zone of the laminated spring. These two steps 620, 624 meet step 608 of the cam disk 604 one after the other, so that two different force thresholds are defined in turn. A transition surface 622 is arranged between the first step 620 and the second step 624 of the biasing element.

Figure 7A:
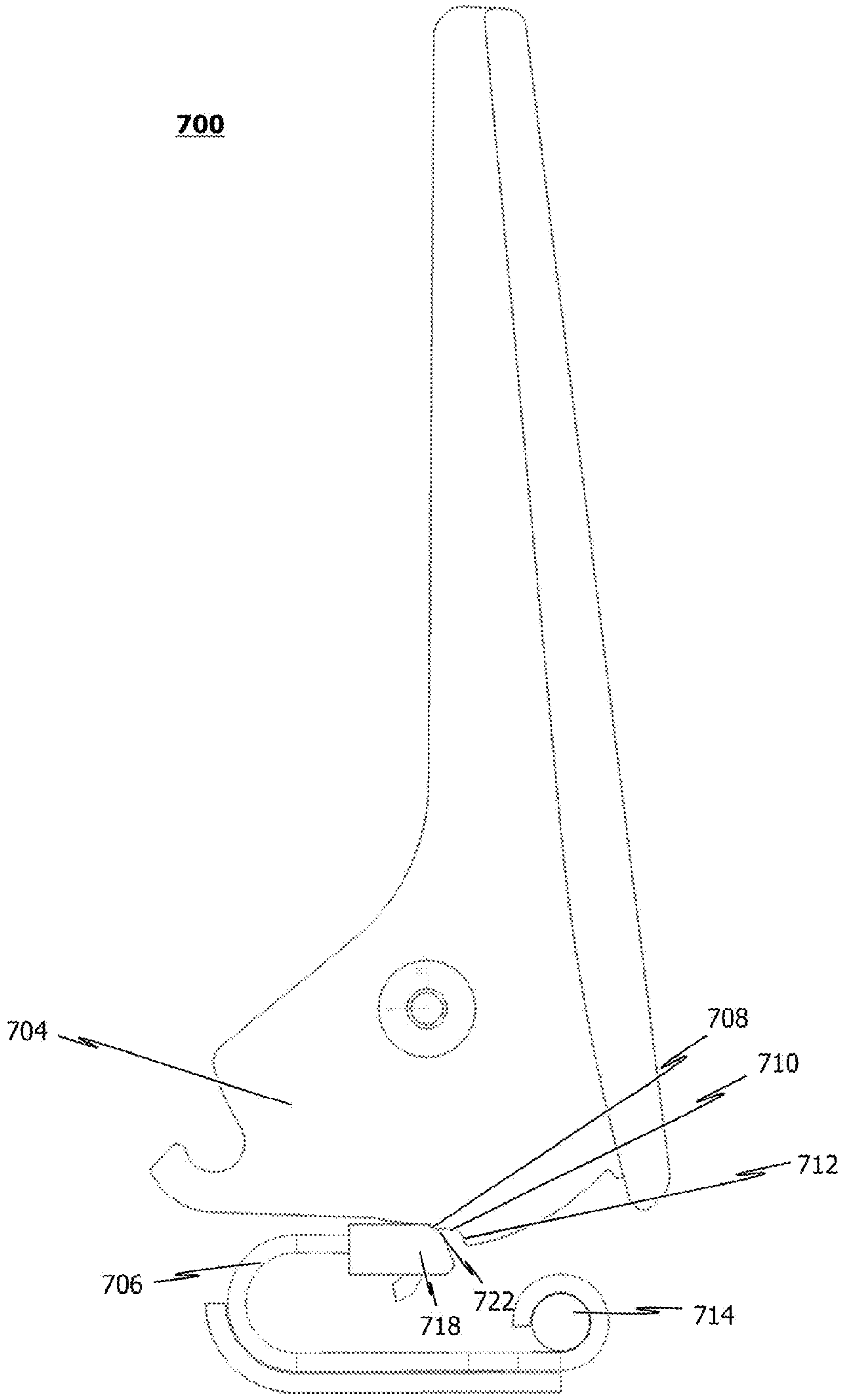
FIG. 7A illustrates a schematic side view of a kinematics having a cam disk connected to a biasing element according to one embodiment of the actuating mechanism.
Figure 7B:
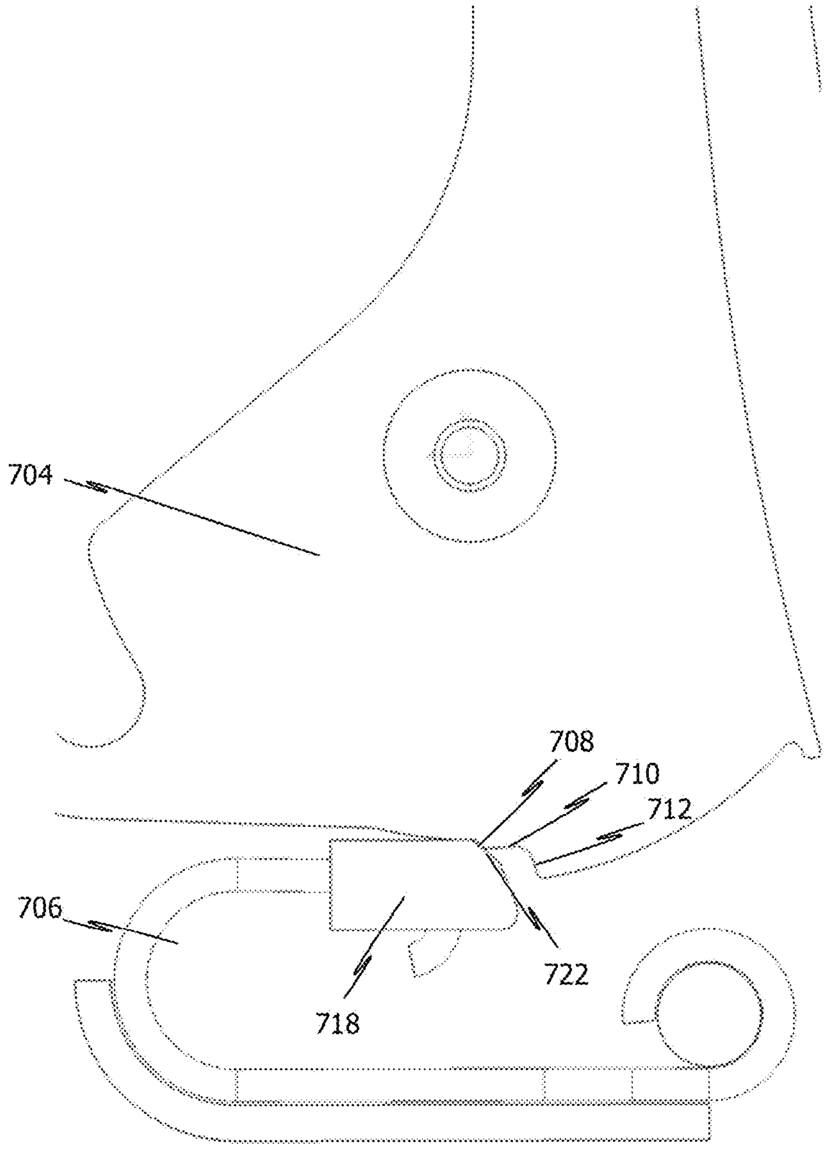
FIG. 7B illustrates an enlarged view of the embodiment according to FIG. 7A.

FIGS. 7A and 7B show a further embodiment, which is substantially identical to the embodiment according to FIGS. 3A and 3B. Also according to FIGS. 7A and 7B, an attachment, in particular a plastic attachment 718, is provided, which is attached to the first end of the biasing element 306. By contrast to the embodiment according to FIGS. 3A and 3B, the plastic attachment 718 of the kinematics 700 according to FIGS. 7A and 7B comprises no recess. Accordingly, the front end 722 of the plastic ledge 718 runs for two steps 708, 712 of the cam disk (cf. FIG. 2A) or the transition surface 710 therebetween. Accordingly, the two steps 708, 712 of the cam disk 704 according to FIGS. 7A and 7B are configured as ledges.

Figure 8A:
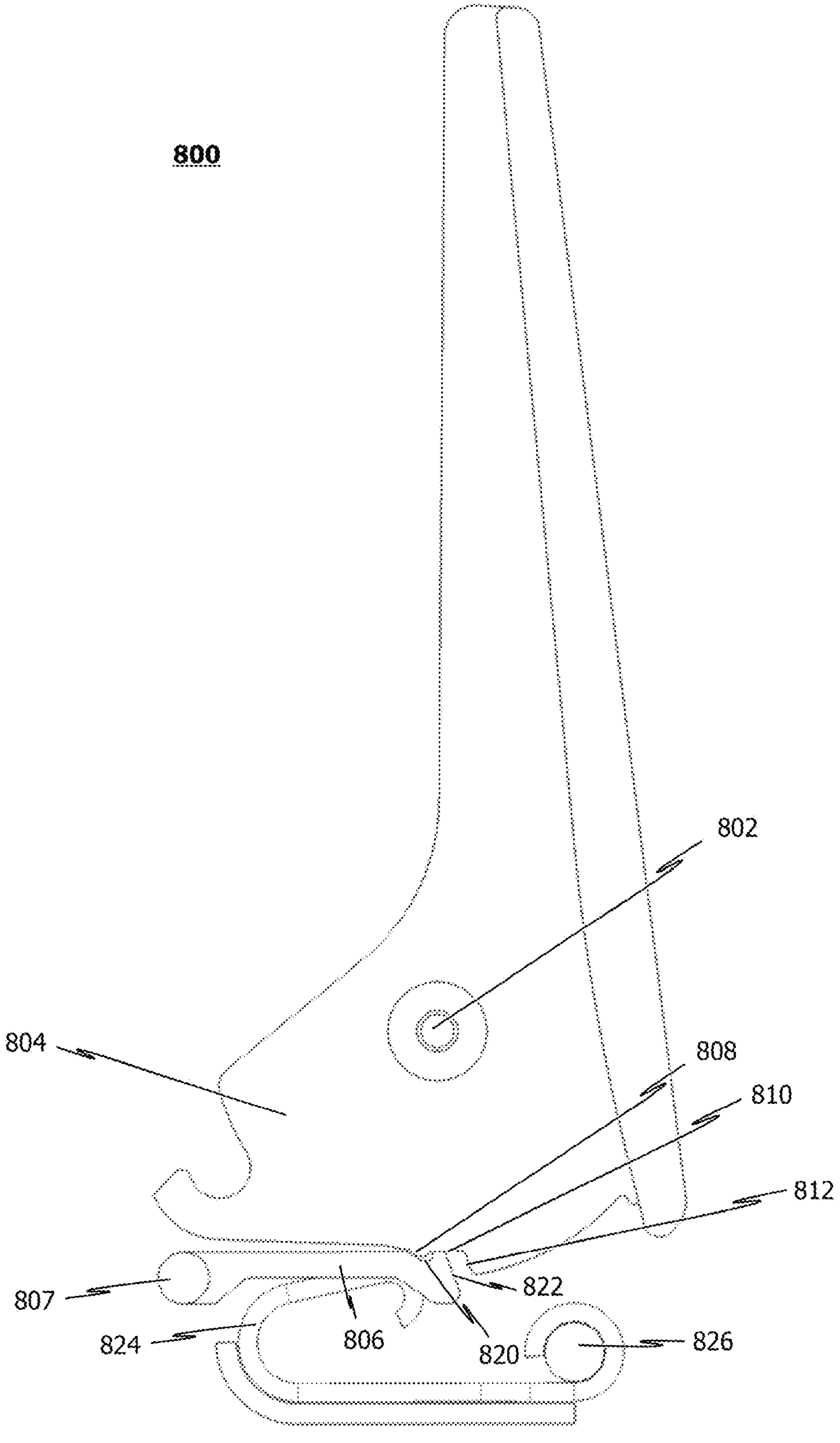
FIG. 8A illustrates a schematic side view of a kinematics having a cam disk connected to a biasing element according to one embodiment of the actuating mechanism.
Figure 8B:
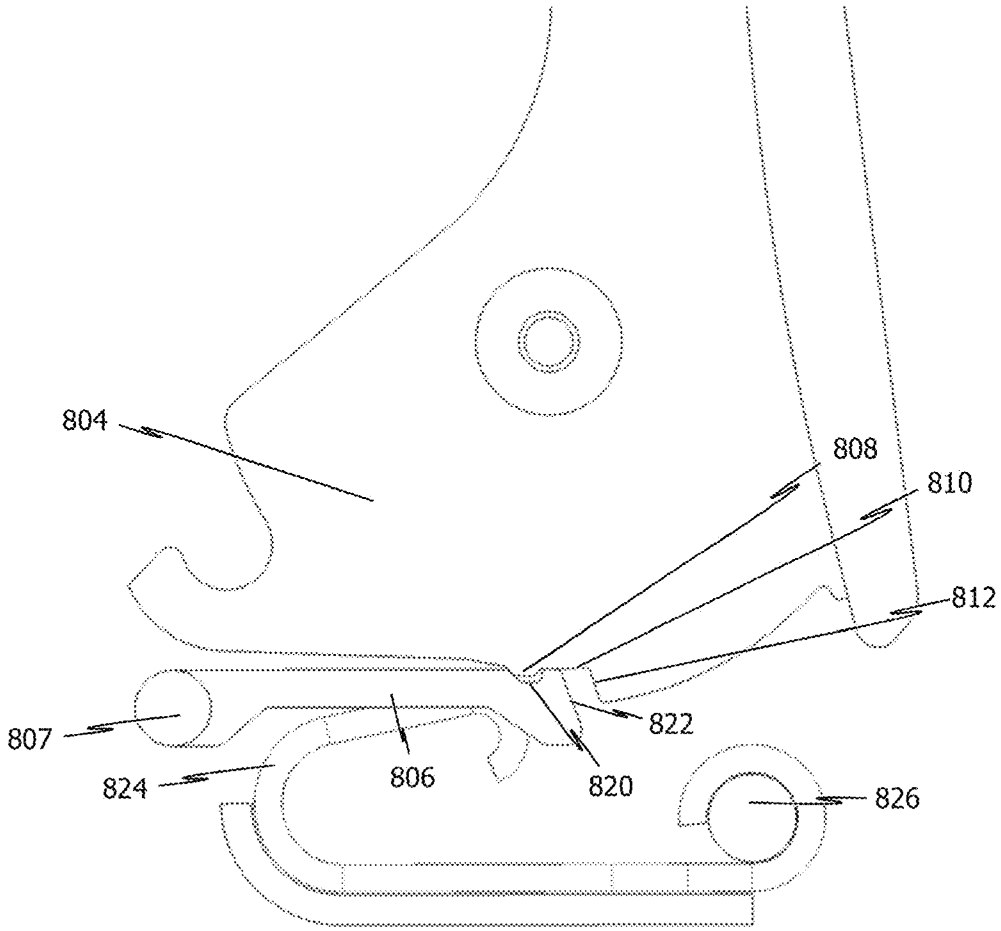
FIG. 8B illustrates an enlarged view of the embodiment according to FIG. 8A.

A further embodiment is illustrated in FIGS. 8A and 8B. The embodiment according to FIGS. 8A and 8B substantially corresponds to the embodiment according to FIGS. 4A and 4B. Similar to FIGS. 4A and 4B, the embodiment of the kinematics 800 according to FIGS. 8A and 8B also comprises a biasing element 806 formed of plastic. However, the biasing element 806 is not a spring. Rather, the biasing element 806 made of plastic is substantially rigid and pivotable about a bearing 807.

The biasing element 806 formed as a plastic part comprises a recess 820 on an end of the biasing element 806 opposite the bearing 807. The recess 820 is configured to cooperate with a first shoulder 808 of the cam disk 804 configured as a nose in order to define the first force threshold. The biasing element 806 further comprises a front end region 822 configured to cooperate with the second shoulder 812 of the cam disk 804 configured as a ledge in order to define the second force threshold.

By contrast to the embodiment illustrated in FIGS. 4A and 4B, however, the biasing element 806 is not configured as a spring. Rather, in the embodiment according to FIGS. 8A and 8B, an additional spring element 824 is provided, which serves to push/bias the biasing element 806 toward the cam disk 804. For example, the spring element 824 can be configured as a metal spring, as shown in particular in the embodiment according to FIGS. 2A and 2B. Here, a first end of the spring element 824 formed as a metal spring is in contact with a rear side of the biasing element 806 opposite the cam disk 804. The biasing element 806 can in particular be plate-shaped, such that the contact surface between the biasing element 806 and the spring element 824 is increased.

A second end of the spring element 824 is connected to a vehicle housing, for example, the vehicle door, and thus fixed. In the illustrations according to FIGS. 8A and 8B, for example, the second end is fixedly connected to a pin 826 of the vehicle housing.

According to the embodiment of FIGS. 8A and 8B, the force thresholds are defined by the biasing force of the spring element 824, as well as the dimensions of the first and second shoulders 808, 812. The biasing element 806, which is configured as a plastic element, serves as a contact element arranged between the spring element 824 and the cam disk 804.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An actuating mechanism for opening a vehicle door, wherein the actuating mechanism comprises:

an actuator for opening the vehicle door;

a kinematics for transmitting a movement of the actuator to a signal transmitter, wherein the kinematics comprises a cam disk; and a biasing element biased against the cam disk, wherein the cam disk is configured to rotate about an axis with respect to the biasing element, wherein the cam disk is configured such that the biasing element encounters a first feature that impedes rotation of the cam disk and then the biasing element encounters a second feature that impedes rotation of the cam disk, wherein the cam disk and the biasing element are configured such that the first feature defines a threshold for a first force and the second feature defines a threshold for a second force, wherein, as the cam disk rotates, the threshold for the first force must be overcome for the cam disk to continue to rotate, and wherein, subsequently, the second force must be overcome for the cam disk to continue to rotate.

2. The actuating mechanism according to claim 1, wherein the first feature comprises a first step, which is configured to deform the biasing element by a first length before the first rotation is released, and wherein the second feature comprises a second step, which is configured to deform the biasing element by a second length before the second rotation is released.

3. The actuating mechanism according to claim 2, wherein the second length is greater than the first length.

4. The actuating mechanism according to claim 2, wherein the cam disk comprises a transition region between the first step and the second step defining a rotational path of the cam disk during the first rotation.

5. The actuating mechanism according to claim 2, wherein the second step is formed by a ledge or nose of the cam disk.

6. The actuating mechanism according to claim 1, wherein the biasing element comprises a metal spring configured to contact the cam disk with a first end.

7. The actuating mechanism according to claim 6, wherein the biasing element comprises a plastic attachment arranged on the first end of the biasing element.

8. The actuating mechanism according to claim 1, wherein the biasing element comprises a plastic spring.

9. The actuating mechanism according to claim 1, wherein the biasing element comprises a laminated spring.

10. The actuating mechanism according to claim 9, wherein the laminated spring comprises a first and a second step, each cooperating with a respective step of the cam disk in order to define the first and second force threshold.

11. The actuating mechanism according to claim 1, wherein the kinematics is configured such that the first rotation of the cam disk serves to activate the signal transmitter.

12. The actuating mechanism according to claim 1, wherein the kinematics is configured such that the second rotation of the cam disk serves to activate an emergency release.

13. The actuating mechanism according to claim 1, wherein actuator is a handle.

14. The actuating mechanism according to claim 2, wherein the first step is configured to compress the biasing element.

15. The actuating mechanism according to claim 2, wherein the second step is configured to compress the biasing element.

16. A vehicle door having the actuating mechanism according to claim 1.

17. An actuating mechanism for opening a vehicle door, wherein the actuating mechanism comprises:

an actuator;

a kinematics for transmitting a movement of the actuator to a signal transmitter, wherein the kinematics comprises a cam disk; and a biasing element biased against the cam disk, wherein the cam disk is configured to rotate about an axis with respect to the biasing element, wherein the cam disk is configured such that the biasing element encounters a first feature that impedes rotation of the cam disk and then the biasing element encounters a second feature that impedes rotation of the cam disk, wherein the cam disk and the biasing element are configured such that the first feature defines a threshold for a first force and the second feature defines a threshold for a second force, wherein, as the cam disk rotates, the threshold for the first force must be overcome for the cam disk to continue to rotate, wherein, subsequently, the second force must be overcome for the cam disk to continue to rotate, wherein the kinematics is configured such that a first rotation of the cam disk serves to activate the signal transmitter, and wherein the kinematics is configured such that a second rotation of the cam disk serves to activate an emergency release.

18. The actuating mechanism of claim 17, wherein the kinematics further comprises a hook configured to accommodate a Bowden pull.

19. The actuating mechanism of claim 18, wherein the hook is connected to the cam disk.

20. The actuating mechanism of claim 17, wherein the threshold for the second force is higher than the threshold for the first force.

* * * * *